(12) United States Patent
Philavong

(10) Patent No.: US 10,363,800 B2
(45) Date of Patent: Jul. 30, 2019

(54) TARPAULIN BRACKET SYSTEM

(71) Applicant: Precision Tarp Inc, Elgin, IL (US)

(72) Inventor: Sor Philavong, Elgin, IL (US)

(73) Assignee: Precision Tarp Inc., Elgin, IL (US)

( * ) Notice: Subject to any disclaimer, the term of this patent is extended or adjusted under 35 U.S.C. 154(b) by 0 days.

(21) Appl. No.: 15/812,349

(22) Filed: Nov. 14, 2017

(65) Prior Publication Data

US 2018/0222298 A1    Aug. 9, 2018

Related U.S. Application Data

(60) Provisional application No. 62/421,738, filed on Nov. 14, 2016.

(51) Int. Cl.
*B60J 7/06* (2006.01)
*B60J 7/10* (2006.01)

(52) U.S. Cl.
CPC .............. *B60J 7/104* (2013.01); *B60J 7/062* (2013.01)

(58) Field of Classification Search
CPC .................................. B60J 7/104; B60J 7/10

USPC ....................................... 296/100.12, 100.13
See application file for complete search history.

(56) References Cited

U.S. PATENT DOCUMENTS

| | | | | |
|---|---|---|---|---|
| 4,902,065 A | * | 2/1990 | Thralls | B60J 7/062 248/251 |
| 5,664,824 A | * | 9/1997 | Stephens | B60J 7/102 296/100.17 |
| 8,777,293 B2 | * | 7/2014 | Garska | B23P 11/00 296/100.15 |
| 9,522,705 B1 | * | 12/2016 | McWilliams | B62D 33/04 |

* cited by examiner

*Primary Examiner* — Pinel E Romain
(74) *Attorney, Agent, or Firm* — Bishop, Diehl & Lee, Ltd.

(57) ABSTRACT

A tarpaulin system for an open cargo hold. The tarpaulin system includes a tarpaulin, a plurality of bows, a plurality of connectors, a cable, and a tail end system. The plurality of connectors connects the plurality of bows to the cable while the tarpaulin is draped atop the plurality of bows. The tarpaulin bracket system allows for quick, and easy, replacement, or fixing, of the plurality of connectors or damaged bows allowing for much easier and efficient replacement while traveling in harsh environments.

10 Claims, 8 Drawing Sheets

US 10,363,800 B2

TARPAULIN BRACKET SYSTEM

RELATED APPLICATIONS

This application claims the filing priority of U.S. Provisional Application Ser. No. 62/421,738 titled "Tarpaulin Bracket System" and filed on Nov. 14, 2016. The '738 application is hereby incorporated by reference.

TECHNICAL FIELD OF THE INVENTION

The present invention relates to a tarpaulin (aka, tarp) system for an open cargo hold of a vehicle. Particularly, the application relates to a tarpaulin bracket system for mounting to a vehicle to provide a structure for attachment of a tarp. Unique components of as well as methods and devices for creating such a tarpaulin bracket system are also described.

BACKGROUND OF THE INVENTION

In the past, trucks often carried loose cargo within open-top trailers. The cargo was often damaged due to weather conditions or portions lost during transit. Further, the hazards of loose items flying out of the open-top of cargo trailers has led many governing bodies to enact strict laws against such open transport. As a result, transporters started covering the cargo area of trucks to protect the goods from rain and minimize, if not eliminate items flying out of the truck trailer.

The traditional method of covering the cargo was with a tarpaulin. Initially, the tarpaulin was stretched across the open top and attached at the trailer sides. This was effective, but had many drawbacks related to attachment/detachment time and sagging of the tarp onto the goods—such as hot asphalt—being transferred. Later, a series of bows was brought into use to keep the tarpaulin from lying in direct contact with goods in the truck trailer and to prevent water accumulation. Now, the tarpaulin hangs across the bows and is connected to a motorized cable system. The motorized cable system is used to move the tarpaulin forward and backward across the cargo hold.

The current system works well until one of the bows breaks. Then the entire tarpaulin system must be dismantled so the broken bow can be fixed or replaced. This job is tedious and can take a long time to complete.

Additionally, the motorized system doesn't always extend far enough to cover the entire open-top cargo hold. Even a small open area can present a danger when loose items are being transported in high-traffic areas.

Accordingly, there is a need in the art for an improved system for quickly and effectively connecting a tarpaulin to a truck trailer and for an improved method of creating such a tarpaulin system.

These and other problems are addressed by the present system and its components to provide a unique structure with numerous advantages in operation and effectiveness.

SUMMARY OF THE INVENTION

There is disclosed herein a tarpaulin bracket and bracket system for attachment to an open cargo hold for a vehicle, which avoid the disadvantages of prior tarpaulin systems and components while affording additional and structural operating advantages.

Generally speaking, the tarpaulin bracket system is comprised of a cable system, a plurality of bows for supporting a tarpaulin, and a plurality of connectors. The cable system comprises right and left first end pulleys, right and left second end pulleys, a first cable connecting the right first end pulley to a right second end pulley, a second cable connecting the left first end pulley to the left second end pulley, and a drive for moving the right and left first end pulleys simultaneously and having an aperture in each of two opposing ends. The plurality of connectors is detachably connected to one of either the first and second cables and to each end of every bow. Each connector comprises a first plate member, a second plate member and a fastener.

In a specific embodiment, the first plate member has a planar surface with an aperture, two opposing upturned sidewalls along at least a portion of opposing sides of the planar surface so as to define a channel, and a planar flange portion extending from an end of the planar surface positioned between the upturned sidewalls. The second plate member has a planar surface with an aperture therein and a curved flange portion extending from the planar surface along an end. The fastener connects the first and second plate members to a bow, wherein the apertures in the respective planar surfaces of the first and second plate members align with one another and an aperture in an end of a bow to allow the fastener to pass through the three aligned apertures so as to sandwich the end of the bow between the first and second plate members in a manner such that the planar flange of the first plate member substantially abuts the curved flange of the second plate member so as to attach the connector to one of either the first cable or the second cable positioned between the two flanges.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
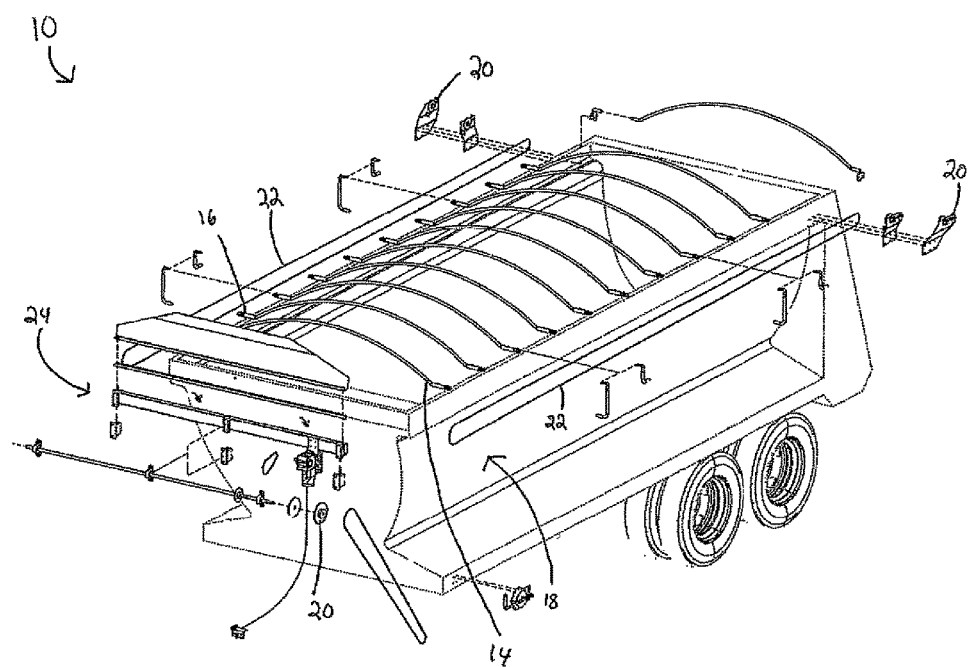
FIG. 1 is an exploded view of an embodiment of a tarpaulin bracket system in accordance with the present disclosure.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring now to FIGS. 1-5, there is illustrated an exemplary embodiment of the tarpaulin bracket system 10 and its components. The tarpaulin bracket system 10 is comprised of a tarpaulin 12, a plurality of bows 14, a plurality of connectors 16, and a cable system 18 with pulleys 20 and cables 22. Preferably, most of these components are made of strong materials to withstand the conditions of being atop an open cargo area of a vehicle during transportation of goods.

The system 10 begins with the cable system 18 attached at the front of the open cargo area (see U.S. Pat. No. 6,981,734, which is hereby incorporated by reference). A first set of left and right pulleys 20 are attached at the front with a second set of left and right pulleys 20 attached at the rear of the cargo hold. A drive mechanism 24 is also attached at the front of the cargo. The drive mechanism 24 is coupled to the first pair of pulleys to rotate each simultaneously. The drive mechanism 24 may be either manual or power-aided. A cable 22 connects the two right pulleys and a second cable connects the two left pulleys.

Figure 2:
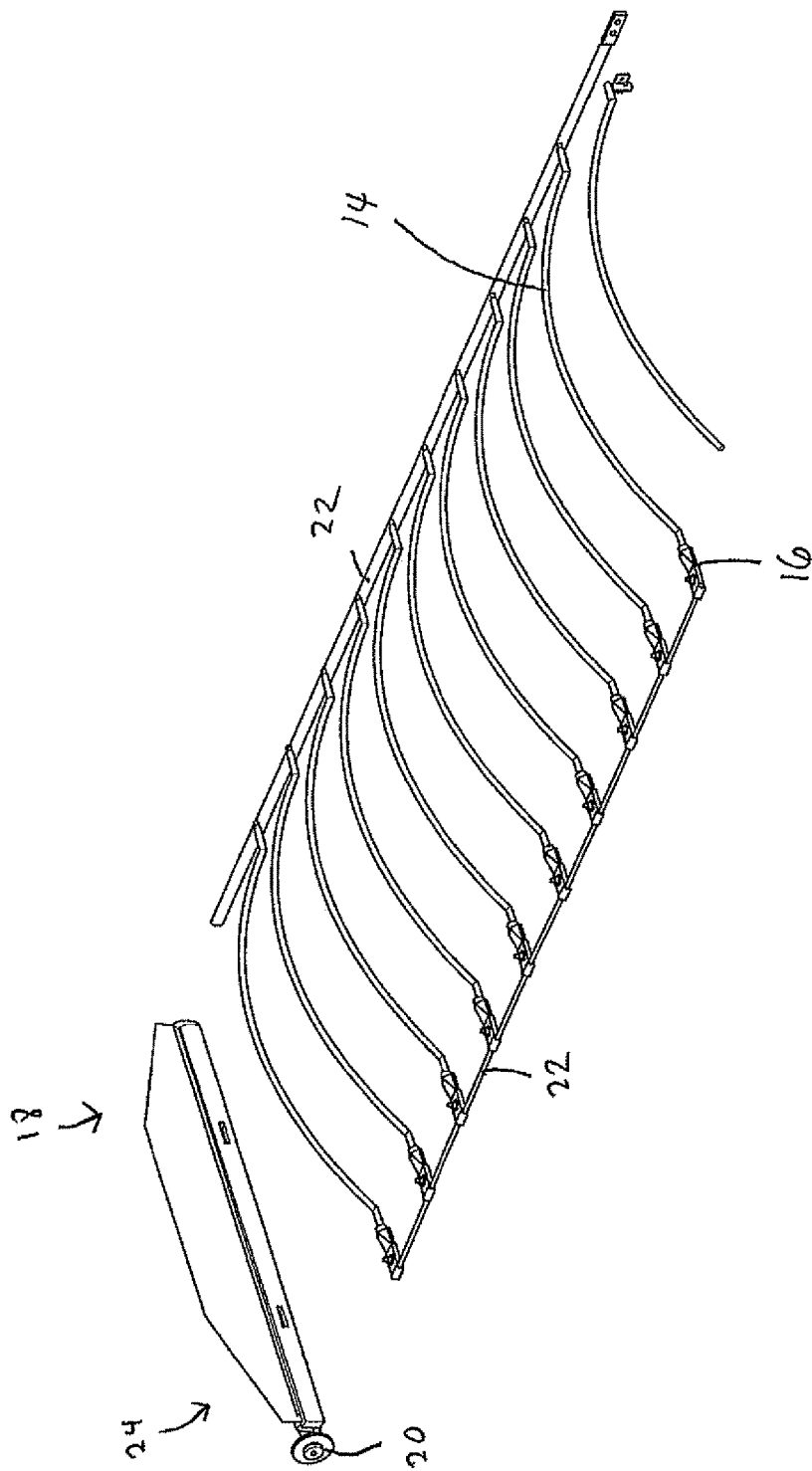
FIG. 2 is a perspective view of an embodiment of a plurality of bows connected to a cable system.
Figure 3:
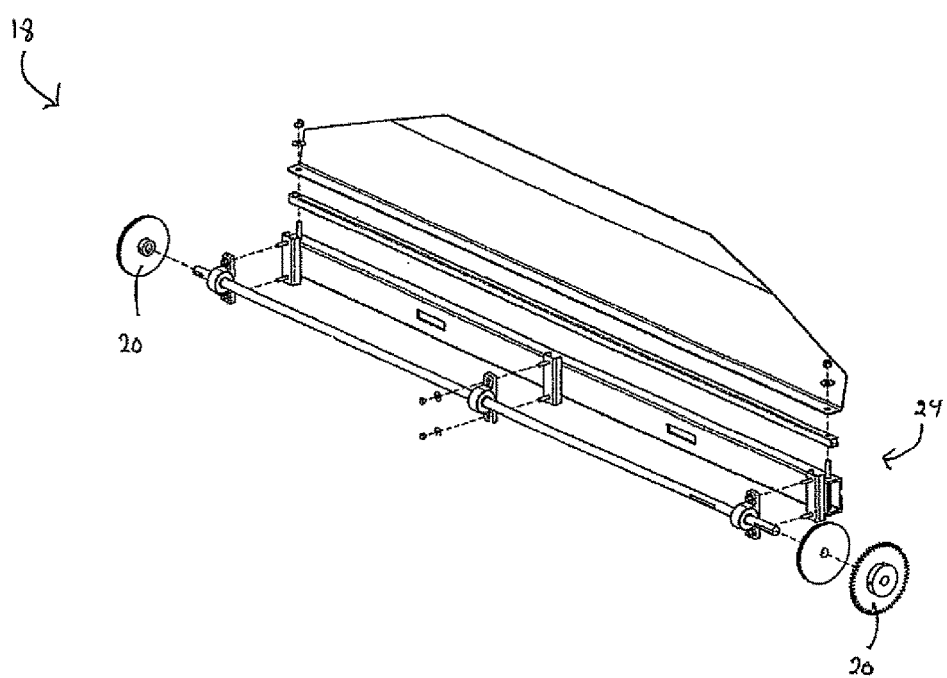
FIG. 3 is a perspective view of an embodiment of the front portion of the cable system.

Across the open-top of the cargo area, a plurality of bows 14 is arranged, as shown in FIG. 2. The opposing ends on each bow include a substantially flat portion 26 with an aperture 28. On each end of each bow 14 a connector 16 is attached, as shown in FIGS. 4 and 5.

The connector 16 is comprised of a first plate 30, a second plate 32, and a fastener 34. The first plate 30 has a planar surface 36 with an aperture 38, two opposing upturned sidewalls 40 along at least a portion of opposing sides of the planar surface 36, and a planar flange 42 extending from an end of the planar surface 36. A channel 44 is formed by the sidewalls 40 to allow the substantially flat portion 26 of the bow end to slide into engagement with the first plate 30.

Figure 4:
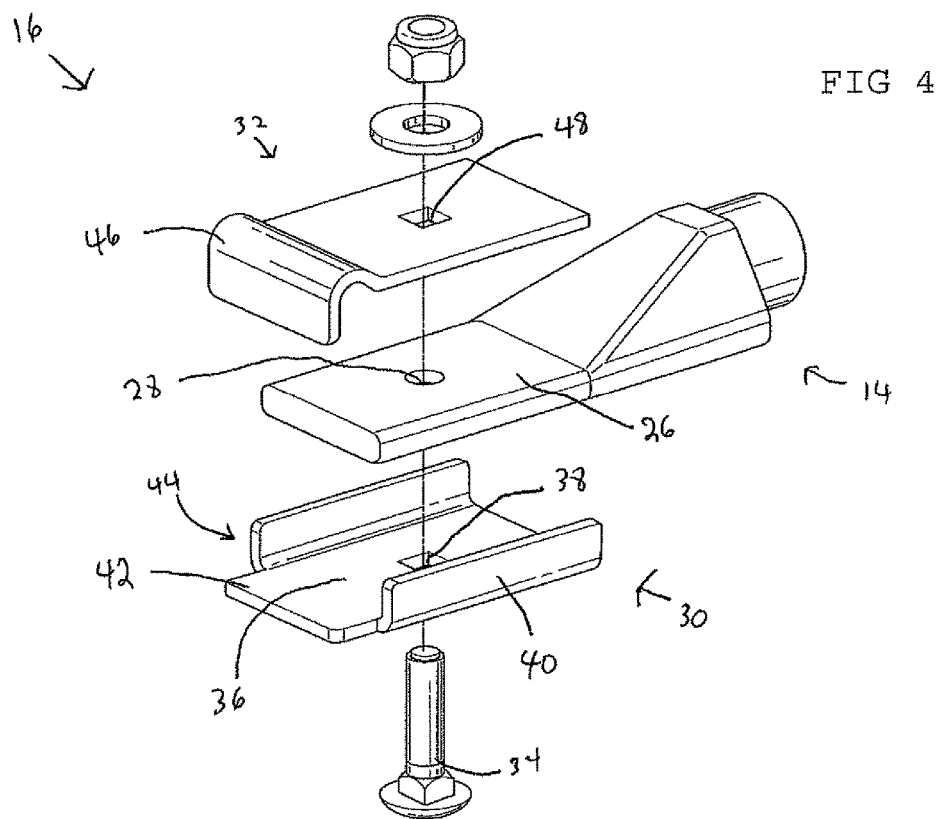
FIG. 4 is an exploded view of one embodiment of a two-piece tarpaulin bow bracket.
Figure 5:
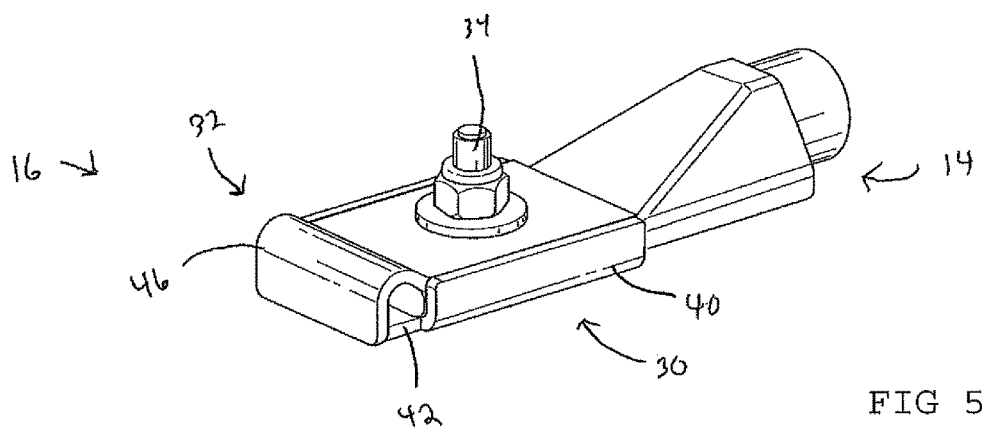
FIG. 5 is an isometric view of a the two-piece tarpaulin bow bracket of FIG. 4.

The second plate 32, having a curved flange 46 and aperture 48, is placed above the flat portion 26 to thereby sandwich the bow end in cooperation with the first plate 30, as shown in FIG. 4. The apertures 48, 28, 38 align to allow the fastener 34 to be inserted and secured.

However, before tightly securing the fastener 34, the curved flange 46 which is abutted by the planar flange 42 to form a tube-like structure is secured about one of either the first or second cable 22. Once the fastener 34 is properly tightened, the connector 16 secures the bow to the cable 22. This is repeated for the other end of the bow 14 until all bows are properly spaced and secured to the first and second cables 22 of the cable system 18.

Finally, a tarpaulin 12 can be attached to the bows 14 in a usual manner. As the cable system 18 is operated, the cables 22 move about the pulleys 20. The connectors 16 are also moved, thereby moving the attached tarpaulin 12.

In the event any bows 14 becomes damaged, as often happens, the connectors 16 on each end of the damaged bow 14 can be easily removed by removing the fastener 34. A new bow 14 can then be inserted and reattached to the connectors 16 and the cable 22.

The tarpaulin 12 is preferably made of water resistant material such as polyethylene, canvas, vinyl, or similar material. The cables 22 are preferably braided and made of a strong metal material. The plurality of connectors 16 are made of a strong pressed metal. The plurality of bows 14 are made from a variety of metal materials welded to allow the plurality of bows to have the necessary strength to withstand being atop the open cargo vehicle.

Figure 6:
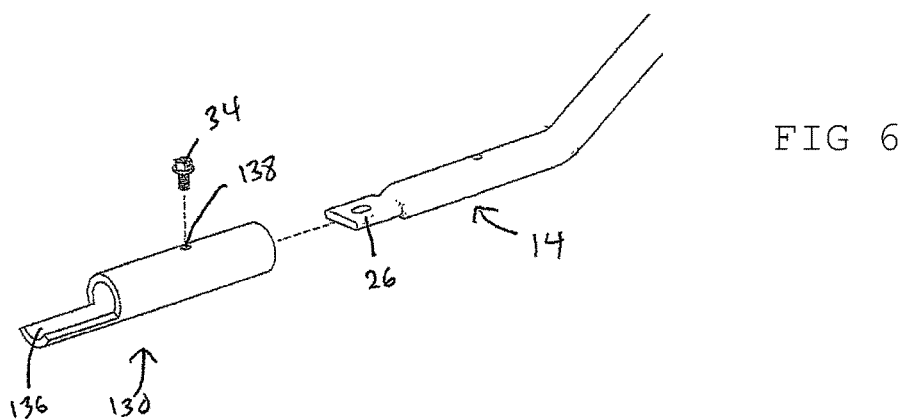
FIGS. 6 and 7 are isometric views of an alternate two-piece tarpaulin bow bracket.
Figure 7:
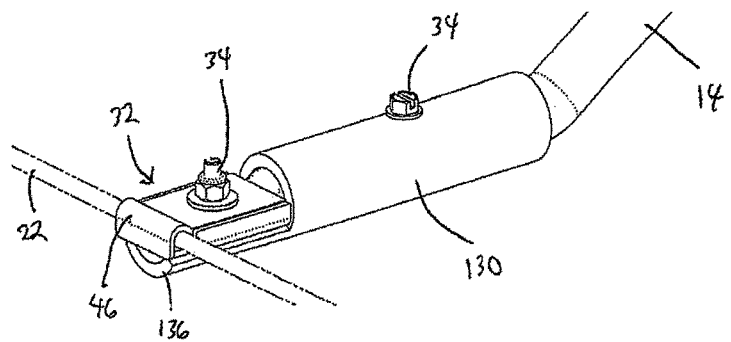

In an alternate embodiment of the connector 16, as shown in FIGS. 6 and 7, a sleeve 130 replaces the first plate member 30 and is separately attached to the bow 14 at a point distal to the substantially flat end 26. The sleeve 130 includes a laterally curved extension 136 with an aperture 138. The sleeve 130 and second plate 32 are then connected by fastener 34 to sandwich the bow end 26 and connect to the cable 22.

Figure 8:
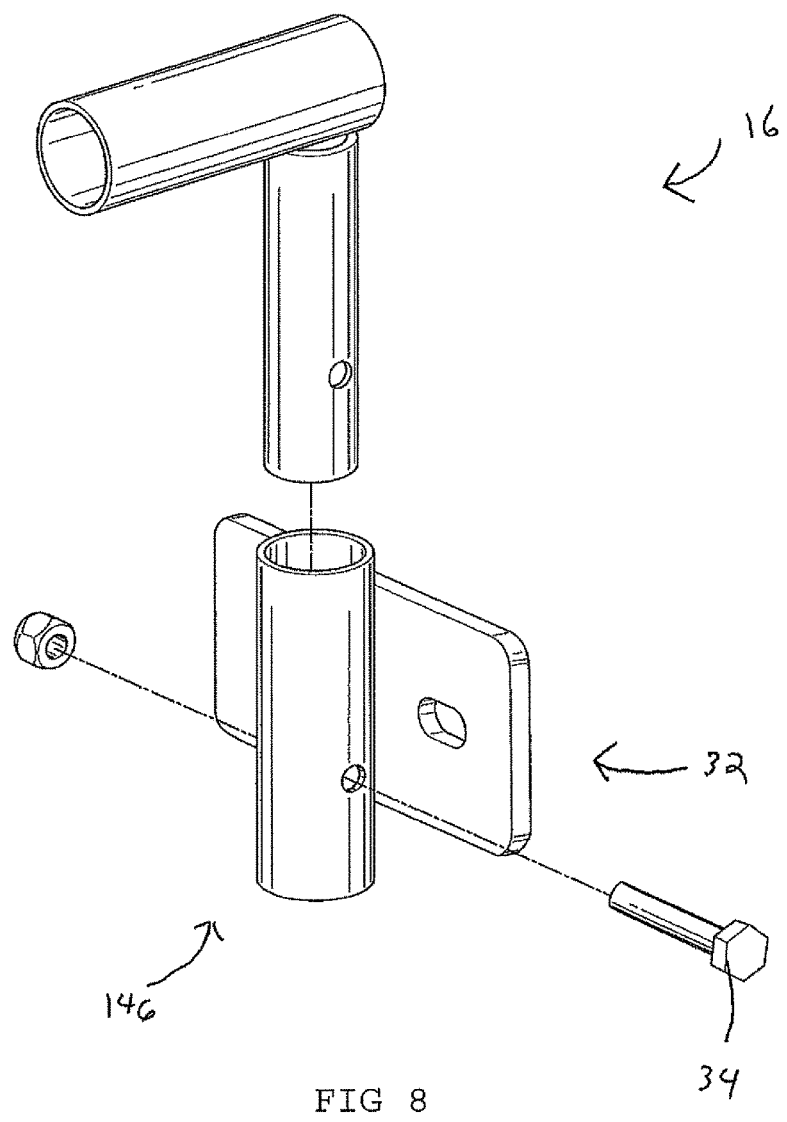
FIG. 8 is an exploded view of another alternate embodiment of a two-piece tarpaulin bow bracket.

In still another embodiment, shown in FIG. 8, the curved flange 46 on the second plate 32 and the planar flange 42 on the first plate 30 are replaced with a tubular flange 146 on the second plate 32. In this embodiment, the second plate 32 is permanently attached to the cable 22, but removal of the fastener 34 still allows the connector 16 to be detached from the a damaged bow 14.

Figure 9:
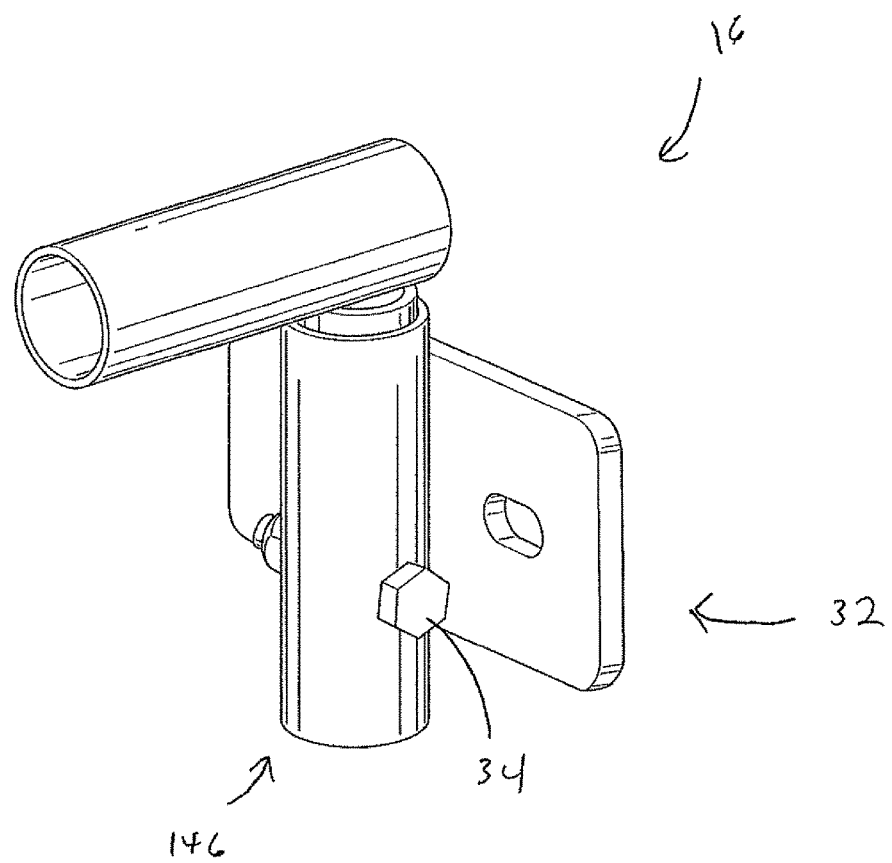
FIG. 9 is an exploded view of an embodiment of a bracket for a stationary bow.
Figure 10:
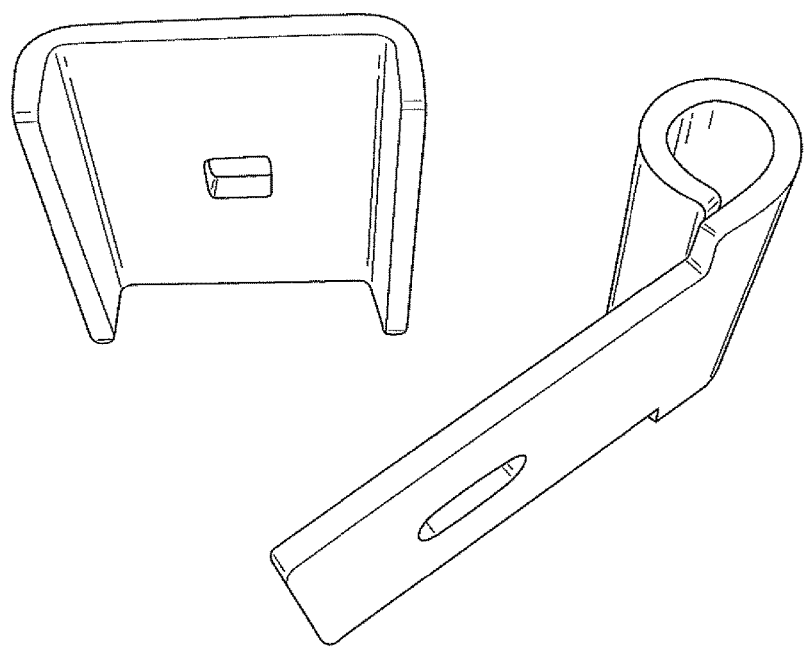
FIG. 10 is an isometric view of the bracket of FIG. 9.

As an additional feature of the system 10, a stationary bow 114 may be positioned within the cargo hold of a trailer, as shown in FIGS. 2 and 9-10. The stationary bow 114 provides a fixed position onto which a separate tarpaulin (not shown) can be attached. As the cable system 18 is unable to run to the end of the open-top cargo trailer, this "tail-portion" allows the remaining foot or so of the open-top to be covered during transport. Ideally, the stationary bow 114 would be overlapped a distance (e.g., 4-8 inches) by the last bow of the primary tarpaulin system when closed. When not in use, the stationary bow 114 may be removed by disconnecting the bow bracket 130 from the fixed bracket 140, as shown in FIGS. 9-10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A connector for attaching a bow to a cable assembly in a movable tarpaulin system, the connector comprising:
    a first plate member having a planar surface with an aperture, two opposing upturned sidewalls along at least a portion of opposing sides of the planar surface so as to define a channel, and a planar flange portion extending from an end of the planar surface positioned between the upturned sidewalls;
    a second plate member having a planar surface with an aperture therein and a curved flange portion extending from the planar surface along an end;
    a fastener for connecting the first and second plate members to a bow;
    wherein the apertures in the respective planar surfaces of the first and second plate members align with one another and an aperture in an end of a bow to allow the fastener to pass through the three aligned apertures so as to sandwich the end of the bow between the first and second plate members in a manner such that the planar flange of the first plate member substantially abuts the curved flange of the second plate member so as to attach the connector to a cable positioned between the two flanges.

2. The connector of claim 1, wherein the channel is configured to fit about the end of the bow to prevent movement about the fastener through the aperture.

3. The connector of claim 2, wherein the planar surface of the second plate member sits within the channel when fastened to the bow and first plate member.

4. The connector of claim 1, wherein the fastener is adjustable so as to attach to and detach from a cable positioned between the two flanges.

5. A tarpaulin bracket system for attachment to an open cargo hold for a vehicle, the tarpaulin bracket system comprising:
   a cable system comprising a right and left first end pulleys, right and left second end pulleys, a first cable connecting the right first end pulley to a right second end pulley, a second cable connecting the left first end pulley to the left second end pulley, and a drive for moving the right and left first end pulleys simultaneously;
   a plurality of bows for supporting a tarpaulin and having an aperture in each of two opposing ends;
   a plurality of connectors, wherein a first end of each bow is detachably connected to the first cable by a connector and a second end of each bow is detachably connected to the second cable by a connector;
   wherein each connector comprises:
      a first plate member having a planar surface with an aperture, two opposing upturned sidewalls along at least a portion of opposing sides of the planar surface so as to define a channel, and a planar flange portion extending from an end of the planar surface positioned between the upturned sidewalls;
      a second plate member having a planar surface with an aperture therein and a curved flange portion extending from the planar surface along an end;
      a fastener for connecting the first and second plate members to a bow;
      wherein the apertures in the respective planar surfaces of the first and second plate members align with one another and an aperture in an end of a bow to allow the fastener to pass through the three aligned apertures so as to sandwich the end of the bow between the first and second plate members in a manner such that the planar flange of the first plate member substantially abuts the curved flange of the second plate member so as to attach the connector to one of either the first cable or the second cable positioned between the two flanges.

6. The tarpaulin bracket system of claim 5, wherein the plurality of connectors are individually removable from connection to the cable.

7. The tarpaulin bracket system of claim 5, wherein the plurality of connectors are individually removable from attachment to the plurality of bows.

8. The tarpaulin bracket system of claim 5, further comprising a tarpaulin detachably connected to each of the plurality of bows and movable from an open state to a closed state by operation of the cable system.

9. The tarpaulin bracket system of claim 8, further comprising a fixed bow positioned proximate the second end pulleys.

10. The tarpaulin bracket system of claim 9, wherein the fixed bow is positioned within a truck cargo hold below the cable system so as to be overlapped by at least one of the plurality of bows when in a closed state.

* * * * *